(12) United States Patent
Yakimchuk

(10) Patent No.: US 11,415,102 B2
(45) Date of Patent: Aug. 16, 2022

(54) METHOD AND SYSTEM FOR CONVERTING WIND ENERGY

(71) Applicant: SILA PRIRODI LIMITED LIABILITY COMPANY (SILA PRIRODI LLC), Podolsk (RU)

(72) Inventor: Vyacheslav Antonovich Yakimchuk, Moscow (RU)

(73) Assignee: SILA PRIRODI LIMITED LIABILITY COMPANY (SILA PRIRODI LLC), Podolsk (RU)

( * ) Notice: Subject to any disclaimer, the term of this patent is extended or adjusted under 35 U.S.C. 154(b) by 226 days.

(21) Appl. No.: 16/496,599

(22) PCT Filed: May 22, 2018

(86) PCT No.: PCT/RU2018/000320
§ 371 (c)(1),
(2) Date: Sep. 23, 2019

(87) PCT Pub. No.: WO2018/217128
PCT Pub. Date: Nov. 29, 2018

(65) Prior Publication Data
US 2020/0158082 A1  May 21, 2020

(30) Foreign Application Priority Data

May 22, 2017 (RU) .......................... RU2017117570
May 22, 2017 (RU) .......................... RU2017117571

(51) Int. Cl.
*F03D 5/04* (2006.01)
*F03D 9/25* (2016.01)
*F03D 80/55* (2016.01)

(52) U.S. Cl.
CPC .............. *F03D 5/04* (2013.01); *F03D 9/25* (2016.05); *F03D 80/55* (2016.05)

(58) Field of Classification Search
CPC ... F03D 5/04; F03D 9/25; F03D 80/55; F05B 2240/305; F05B 2240/3052;
(Continued)

(56) References Cited

U.S. PATENT DOCUMENTS

| 3,730,643 | A | | 5/1973 | Davidson | |
|---|---|---|---|---|---|
| 5,134,305 | A | * | 7/1992 | Senehi | ...................... F03D 5/02 290/55 |

(Continued)

FOREIGN PATENT DOCUMENTS

| EP | 2 078 853 | 7/2009 |
|---|---|---|
| FR | 2 297 333 | 8/1976 |

(Continued)

OTHER PUBLICATIONS

International Search Report for PCT/RU2018/000320 dated Sep. 6, 2018, one (1) page.

(Continued)

*Primary Examiner* — Richard A Edgar
*Assistant Examiner* — Jason G Davis
(74) *Attorney, Agent, or Firm* — Nixon & Vanderhye PC

(57) ABSTRACT

The invention relates to the field of energy, in particular to devices converting wind energy into electricity. The wind energy conversion method into electrical energy consisting in that the wind energy is converted by means of receivers mounted on the casing of moving wind energy conversion modules, moving linearly along the guide belt, into movement energy of wind energy conversion modules and electric energy by means of electrical energy generating device, mounted on the casing. Wherein there is performing continuous control, depending on the external conditions of the total area of all wind energy receivers guided to the guide belt. In particular embodiments, there is performing continuous control, depending on the external conditions of (Continued)

setting angles of the wind energy receivers relative to the wind energy conversion modules, the movement speeds of the wind energy conversion modules, the aerodynamic profile, and the area of each wind energy receiver, for which it is preferable to use wings with a composite aerodynamic profile, including the main profile, and at least one tilt flap. Also the system for the method embodiment is claimed.

27 Claims, 3 Drawing Sheets

(58) Field of Classification Search
CPC ............ F05B 2240/31; F05B 2240/311; F05B 2240/313; F05B 2240/94; F05B 2240/941; F05B 2260/4021; F05B 2260/4031; F05B 2260/87
See application file for complete search history.

(56) References Cited

U.S. PATENT DOCUMENTS

| | | | |
|---|---|---|---|
| 5,758,911 A | 6/1998 | Gerhardt | |
| 5,992,341 A * | 11/1999 | Gerhardt | F03D 5/02 114/102.16 |
| 6,672,522 B2 * | 1/2004 | Lee | F03D 5/04 290/44 |
| 7,902,684 B2 * | 3/2011 | Davison | F03D 9/25 290/44 |
| 8,198,748 B1 | 6/2012 | Korzen | |
| 8,950,710 B1 * | 2/2015 | Lumley | F03B 17/06 244/153 R |
| 9,309,865 B2 * | 4/2016 | Kelaiditis | F03D 3/062 |
| 9,366,226 B2 * | 6/2016 | Yan | F03D 5/04 |
| 9,897,071 B2 * | 2/2018 | Davison | F03D 9/25 |
| 2004/0080166 A1 | 4/2004 | Davidson | |
| 2011/0080004 A1 * | 4/2011 | Hadi | F03D 9/255 290/55 |
| 2015/0240781 A1 | 8/2015 | Yan | |
| 2016/0298601 A1 | 10/2016 | Weng et al. | |

FOREIGN PATENT DOCUMENTS

| | | |
|---|---|---|
| GB | 2 450 902 | 1/2009 |
| KR | 10-2014-0056703 | 5/2014 |
| RU | 2 451 826 | 5/2012 |
| SU | 1281740 | 1/1987 |
| SU | 1686216 | 10/1991 |
| UA | 15 761 | 7/2006 |
| WO | 02/02934 | 1/2002 |
| WO | 2008/062319 | 5/2008 |
| WO | 2008/120257 | 10/2008 |
| WO | 2016/130438 | 8/2016 |
| WO | 2016/150561 | 9/2016 |
| WO | 2016/154757 | 10/2016 |

OTHER PUBLICATIONS

International Search Report issued in PCT/RU2018/000319 dated Sep. 6, 2018.

* cited by examiner

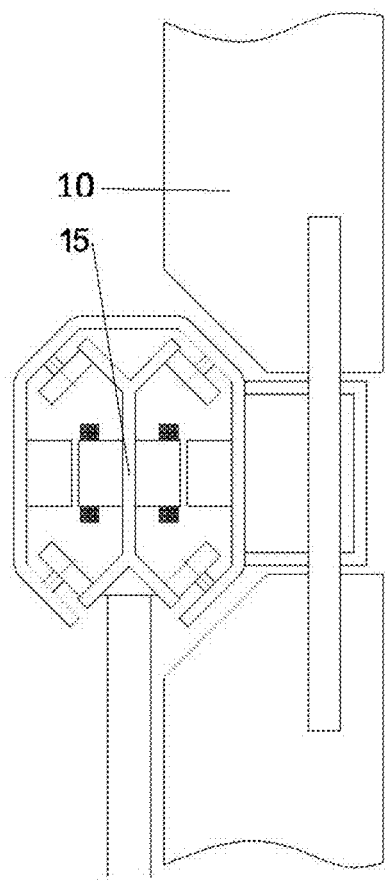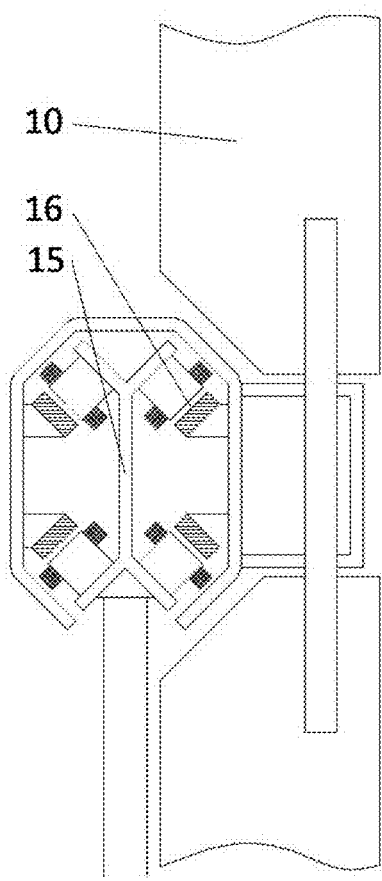
Fig.7                    Fig.8

METHOD AND SYSTEM FOR CONVERTING WIND ENERGY

This application is the U.S. national phase of International Application No. PCT/RU2018/000320 filed May 22, 2018 which designated the U.S. and claims priority to RU Patent Application No. 2017117570 filed May 22, 2017 and RU Patent Application No. 2017117571 filed May 22, 2017, the entire contents of each of which are hereby incorporated by reference.

FIELD OF THE INVENTION

The invention relates to the field of energy, and more specifically, to wind power plants that generate electrical energy by using air flow force.

BACKGROUND OF THE INVENTION

A wind energy conversion system comprising a guide belt, wind energy conversion modules, including wind energy receivers, configured to move along the guide belt due to wind energy, which allows to implement method of wind energy conversion into electrical energy, wherein the wind energy is converted, by means of wings with an aerodynamic profile mounted on carriages and moved linearly along the guide path with roller support, into motion energy of wind energy conversion modules and electric energy (WO 2016150561 A) is known from the prior art.

A system for conversion of wind energy into electricity, which implements a wind energy conversion method, wherein the wind energy is converted, by means of sails mounted on the casing of trolleys moving linearly along a closed rail track, into movement energy of wind energy conversion modules and electric energy by a mechanical generator (EP 2078853 A1) is also known.

A wind energy conversion system comprising a guide belt, consisting of straight and curved sections, wind energy conversion modules, including wind energy receivers configured to orient relative to the wind, configured to move along the guide belt due to wind energy is also known.

A system that allows to implement a wind energy conversion method into electrical energy, wherein the wind energy is converted, by means of wing profiles mounted on the casing of mobile wind energy conversion trolleys that perform linear movement along the rail track, into the movement energy of wind energy conversion modules and electrical energy by means of an electricity generator mounted on the casing, wherein the profiles are oriented by mechanical drive (FR 2297333 A1).

A system for conversion of wind energy into electricity, which implements a method, wherein the wind energy is converted, by means of aerodynamic operating parts mounted on the casing of moving wind energy conversion modules, moving linearly along a closed rail track, into movement energy of wind energy conversion modules and electric energy by means of electricity generator, mounted on the casing (WO 2016154757 A1).

All the solutions described above use the principle of linear motion of the wind energy receiver, wherein traditional solutions known from the prior art use the rotational movement of the wind energy receiver.

Common disadvantages of technical solutions known from the prior art are the following:

the inability to change the total number of modules on the guide belt, and as a result, there is no possibility to change the total area of the operating wind energy receivers, which leads to the impossibility of the system operation with the maximum coefficient of wind energy usage (CWEU) in a wide range of wind speed;

the inability to eliminate wind energy losses caused by the flow downwash downstream the operating wind energy receivers;

inability of efficient operation of the system at a low translational speed of the wind energy receivers, which leads to the appearance of aerodynamic noise and infra sound waves;

narrow range of wind speeds at which the method is effective due to the impossibility of changing the wing area and the installed generator capacity. The traditional wind generator operates with optimum performance, according to some estimates, for not more than 15% of the time. Other days, the wind is too weak for operation or too strong sometimes;

achieving an effective operation mode only at high speed, resulting in the generation of high capacity infra sound waves, danger to animals and people, mass death of birds, the need to create a restricted area around the plant;

high loading of structural elements, which forces to use expensive structural materials and technologies;

large dimensions and weight of structural parts, the transportation and installation of which requires unique transport and installation operations;

low maintainability of structures; the replacement of any large part requires repeated unique transport and installation operations;

loss of operability of the structure when any part fails, which causes a downtime until the repair is completed.

Closest to the proposed is a wind energy conversion method into electrical energy and a system for its implementation comprising a guide belt, wind energy conversion modules including wind energy receivers in the shape of kites made configured to moving along the guide belt due to wind energy, and a movement control and coordination device of the wind energy conversion modules, wherein the guide belt is connected with the contact guide interacting with the wind energy conversion modules ensuring electrical current generation at energy conversion modules movement (RU 2451826 C2, publ. May 27, 2012). In the known system the control device is configured to control the angle of attack of kites due to distortion of the shape of the attached cable.

The specified method and system have the following disadvantages.

Inability to change the total number of modules on the guide belt, and as a result, there is no possibility to change the total area of the operating wind energy receivers, which leads to the impossibility of the system operation with the maximum CWEU in a wide range of wind speed.

Inability to eliminate wind energy losses caused by the flow downwash downstream the operating wind energy receivers.

Inability of efficient operation of the system at a low translational speed of the wind energy receivers, which leads to the appearance of aerodynamic noise and infra sound waves.

SUMMARY OF THE INVENTION

The technical object of the claimed technical solution is the creation of wind energy conversion method and system, devoid of the above disadvantages and having increased energy efficiency.

The technical result achieved by the claimed technical solution is to provide a high coefficient of wind energy usage (CWEU), including by decreasing the speed of the modules.

The technical result is achieved through the use of wind energy conversion method into electrical energy, wherein the wind energy is converted, by means of wind energy receivers mounted on the casing of movable wind energy conversion modules moving linearly along the guide belt, into motion energy of wind energy conversion modules and electrical energy by means of an electrical generating device, wherein, according to the invention, continuous control depending on external conditions of the total area of all wind energy receivers put into the guide belt.

In particular embodiments:

performing continuous control, depending on the external conditions of the setting angles of the wind energy receivers relative to the wind energy conversion modules;

performing continuous control, depending on the external conditions of the wind energy conversion modules speed;

performing continuous control, depending on the external conditions of aerodynamic profiles of each wind energy receiver;

performing continuous control, depending on the external conditions of the wind energy conversion modules area;

using wings with a composite aerodynamic profile including a main profile and at least one tilt flap as a wind energy receivers;

using rotary type generator as a device for electricity generation with a shaft which is rigidly connected to the gear wheel run on the gear rail connected with the guide belt;

using a linear generator as an electrical energy generating device, wherein the movable part of the linear generator mounted on the casing moves along the stationary part of the linear generator, which is connected with the guide belt;

using guide belt with at least two closely spaced areas with multidirectional movements of the wind energy conversion modules;

changing total surface area of the wind energy receivers by adding further modules to the guide belt or removing modules from the guide belt, depending on the wind conditions in the current moment of time.

The technical result is also achieved by a system for conversion of wind energy into electricity, comprising a guide belt, wind energy conversion modules including wind energy receivers configured to move along the guide belt due to wind energy, and movement control and coordinating device of wind energy conversion modules, wherein this guide belt is connected with a contact guide interacting with the wind energy conversion modules ensuring current generation during the movement of energy conversion modules, wherein, according to the invention, the device for controlling and coordinating movement of modules is configured to change the number of operating modules by adding further modules to the guide belt or removing modules from the guide belt depending on the wind conditions in the current moment of time.

In particular embodiments, the system is characterized with the following:

The device for controlling and coordinating movement of modules can be configured to continuously change the speed of each module depending on the wind conditions in the current moment of time;

The device for controlling and coordinating movement of modules can be also configured to continuously change the orientation of each wind energy receiver relative to the wind, depending on the wind conditions in the current moment of time;

The device for controlling and coordinating movement of modules can be also configured to continuously change the aerodynamic profile and/or wing area of each module, depending on the wind conditions in the current moment of time;

the guide belt can be installed on a supporting structure in the shape of an access bridge;

the guide belt can also be made curved on difficult terrain or mountainous terrain configured to move wind energy conversion modules;

the guide belt can be loop closed;

in addition, the guide belt can be made in the shape of a rail track;

in the latter, the guide belt is preferably made in the shape of a monorail;

the guide belt may include straight and curved sections, and at least one rectilinear and/or curved section of the closed guide belt may consist of at least two horizontally spaced guides, or of two vertically spaced guides, or of two guides tilted to the horizon;

wherein the movement along the guide belt can be performed by magnetic interaction of the wind energy conversion modules with the guide belt;

the system preferably comprises at least two closely spaced sections of the guide belt with multidirectional movements of the wind energy conversion modules, so that each next row of energy conversion module in the direction of wind movement can use the downwash flow downstream the preceding row;

in one particular embodiment, the contact guide can be made in the shape of an endless gear rail made of soft magnetic steel, with windings on the teeth, interacting by means of electromagnetic forces, at least one short rail contained in the wind energy conversion modules, forming a single device as a linear generator, configured to generating electric current during their interaction;

in another particular embodiment, the contact guide can be made in the shape of a gear rail interacting at the module movement by means of mechanical forces with at least one gear contained in the wind energy conversion modules and configured to run in the gear rail, wherein each wind energy conversion module comprises a rotary generator mechanically coupled to the gear;

The device for controlling and coordinating movement of modules uses the parameters of the generated electricity of each module as an information signal;

wherein the parameters of the generated electricity of each module are the current strength, voltage, frequency or phase;

at least one wind energy conversion module may comprise equipment for diagnosing a guide belt;

at least one wind energy conversion module may comprise snow removal equipment for cleaning the guide belt and the contact guide.

Particular embodiment cases of the claimed technical solution are not confined to the disclosed above cases.

BRIEF DESCRIPTION OF DRAWINGS

The essence of the claimed technical solution is illustrated by graphic documents, wherein:

FIG. 7 shows an embodiment of a system of wind energy conversion into electric energy wherein the guide belt is made in the shape of a monorail.

FIG. 8—shows an embodiment of a system of wind energy conversion into electric energy, wherein the ability to move along a guide belt is due to magnetic interaction of wind energy conversion modules with a guide belt.

PREFERRED EMBODIMENTS OF THE INVENTION

Figure 1:
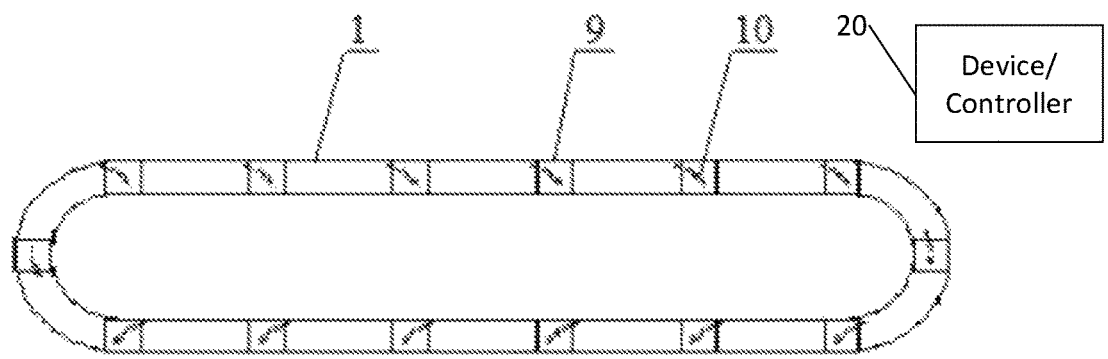
FIG. 1 shows a general diagram of a system of wind energy conversion into electric energy, a basic version of a rail plant.

Below are theoretical grounds of the embodiment of the claimed method on the example of wings used as aerodynamic operating parts.

The method and system embodiment with orienting the rectilinear section of the movement of the wings across the air flow.

The aerodynamic calculation of the system shows that at increasing wing speed across the flow, the power from one square meter grows up to high speeds (from 15 m/s to 200 m/s depending on the aerodynamic quality of the wing).

The dependence is nearly linear.

Wherein the load on the wing structure is also growing.

The main influence criterion in this case is speed (the ratio of the speed of the wing across the flow to the wind speed).

With a speed of less than 2, the aerodynamic quality of the wing plays a small role, the carrying capacity of the wing profile plays a large role, with a speed of more than 2, the aerodynamic quality becomes important, with a value of more than 5 it is critically important. Moreover, the lower the wing speed, the greater the flow downwash.

For the designed plant, the speed of the wing should be limited to:

10 m/s-15 m/s—for safety reasons, environmental friendliness, psychological comfort.

60 m/s—for aerodynamic noise.

5 m/s-30 m/s—for centrifugal overloads when turning.

In practice, when organizing the plant control, the highest speed of the wing, taking into account above limitations should be reached.

The ability of the wing to create aerodynamic forces depends on the wing setting angle relative to the local air flow. Local (in the area of the wing) air flow differs from the natural wind flow by the vector values of the wing speed, braking and the tilt of the flow by the wind generator.

Control parameters:
Input parameters:
apparent wind speed;
apparent wind direction;
actual wind speed;
actual wind direction;
module speed;
distance between modules;
module passing turn over point;
total area of operating wings.
Controlled parameters:
wing setting angle relative to the apparent wind;
flap setting angle relative to the main wing profile (when using a wing with a flap);
wing area;
total area of operating wings;
module speed;
Parameters and control methods:

The wing setting angle relative to the apparent wind is set using the wing rotation servo drive or with the help of a servo-driven auxiliary aerodynamic surface (stabilizer). Apparent wind is a wind perceived by a directly moving wing, the result of the addition of all speed vectors arising from the operation of the wind generator with the actual wind vector.

The control object is to maintain a constant optimum wing setting angle relative to a changing apparent wind, when the aerodynamic force limit for the wing is reached, at the wind increase, gradually reduce the setting angle according to the algorithm (for example, 1° per 1 m/s of wind). When the module is turned from the windward row to the leeward row, the servo-driver turns the wing angle to the opposite to turn the wing thrust vector. Direction sensor, wind speed sensor and a turn point sensor provide initial data. In the case of using a servo stabilizer, it is a wind direction sensor and an aerodynamic amplifier at the same time.

The flap setting angle relative to the main wing profile (when using a wing with a flap) is set using the flap servomotor or with the help of a servo-driven auxiliary aerodynamic surface (stabilizer).

The control object is to maintain a constant optimum flap setting angle relative to the main wing profile, when the aerodynamic force limit for the wing is reached, at the wind increase, gradually reduce the setting angle according to the algorithm (for example, 3° per 1 m/s of wind). When the module is turned from the windward row to the leeward row, the servo-driver turns the flap angle to the opposite to turn the wing thrust vector. Direction sensor, wind speed sensor and a turn point sensor provide initial data. In the case of using a servo stabilizer, it is a wind direction sensor and an aerodynamic amplifier at the same time and performs two functions—controlling the flap setting angle and controlling the wing setting angle as a whole.

The wing area is set by the system depending on the specific wind conditions in order to achieve the optimum value of the total area of the operating wings if the system does not use a change in the number of operating modules, and the electric generators have a power reserve.

The quantity of operating modules is set by the system depending on specific wind conditions in order to achieve the optimum value of two parameters—the total area of the operating wings, and the total capacity of the operating electric generators. The higher the wind speed, the greater the wing area and the higher the installed capacity of the generators for optimum conversion of wind energy.

Total area of operating wings. Depending on the ratio of the total area of the operating wings to the total area of the wind window used by the wind generator, the point of maximum CWEU corresponds to a certain speed (the ratio of the wing speed along the blade to the actual wind speed). The smaller the relative wing area, the higher the optimum speed. When wind speed is increased the absolute speed of the modules with wings should increase in order to maintain optimum CWEU.

But the real allowable speed of modules movement is limited by the following factors:
  aerodynamic noise and infra sound emitted by the plant;
  mechanical noise of moving parts;
  safety for birds;
  safe dispersion of debris during structural destruction;
  dynamic loads during the module passing the turn.

From the point of view of operational safety and environmental friendliness, the absolute speed of the wings should be small. But for wind generators with a low speed, the increase of the wind speed, decreases CWEU due to a decrease in speed. To maintain CWEU of the wind generator at a constantly high level with increasing wind speed, the total area of operating wings needs to be increased. The control system, using the data of actual or apparent wind speed sensors, changes the total area of operating wings by changing the area of each wing and/or adding modules into operation to the belt or by removing excess modules from the belt, in accordance with the specified algorithm.

The module speed is controlled by changing the braking force of the generator. The braking torque of the generator is changed by electronic control of the generator from full braking to a negative value, i.e. before switching to motor mode. The generator ensures braking converting the mechanical power of movement into electrical power. With full braking, the mechanical capacity is zero due to the lack of speed. With zero braking, the speed is maximum, but the mechanical capacity is also zero due to the lack of force. Between these two extreme cases, for each wind condition, there is an optimality point, at which the mechanical power and electric power are maximum. The generator control system changes the power taken by the generator and, therefore, the braking torque created by the generator by electronic control of the current pulses supplied to the generator coils and taken from the coils. In the simplest case, the generator coils operate directly to the alternating current network, wherein the synchronization of the modules speed with the frequency of the alternating current network is automatically ensured.

Control objects:
  ensuring the maximum possible coefficient of wind energy usage (CWEU) with the help of the module as a whole. For each total wing area, there is an optimum speed (the ratio of the wing speed along the belt and the actual wind speed), at which the CWEU of the wind generator is maximum. The speed control system receives data from speed sensors and actual or apparent wind direction sensors, data from the speed sensors of the module, data about the position of other modules, adjusts the braking torque of the generator, constantly maintaining optimum speed, taking into account the following restrictions: maximum allowable speed in this section of belt, uniform distribution of modules on the belt, preventing collision of modules, the necessity to maintain a given frequency of the generated alternating direct current, the necessity to consider the speed, at which the generator electrical efficiency is maximum.
  ensuring the ability of modules breakaway at start-up. Most generators have a significant breakaway force that prevents the wind generator from starting at light wind. The switched-reluctance technology allows the control system, receiving data from the module speed sensor, to minimize the breakaway force to facilitate start-up.
  ensuring emergency shut-down of the modules. If the wind speed exceeds the safe operation limits, the control system, receiving data from actual or apparent wind speed sensors, performs complete braking of the generators of all modules.
  ensuring the performance of transport operations: input of modules to the belt, output of module from the belt, transportation of modules to the depot.

Below are the principles of aerodynamic calculation of a wind generator.

Aerodynamic calculation is carried out for a plant comprising 2 rows of bi-directional moving wings.

For aerodynamic calculation of the plant, speed triangles are built for actual wind speeds of 4 m/s, 6 m/s, 8 m/s, 12 m/s, and for wing cross flow speeds 1 m/s to 15 m/s in 1 m increments. The following speed vectors are taken into account in the speed triangles:
  actual wind;
  cross wind wing speed;
  flow braking;
  flow downwash.

For each combination of wind speed and wing movement, the speed and direction of the apparent wind for each of the two rows, and the direction of the resulting aerodynamic force are determined. According to the obtained data, the wing area necessary for a given wind window is calculated for each combination of speeds using the following parameters:
  air density in the area of the proposed installation of the wind generator;
  optimum lifting coefficient of the selected profile;
  aerodynamic quality corresponding to the selected configuration of the wings;
  the selected size of the wind window.

The following embodiment, given only as an example, is described to provide a more accurate understanding of the preferred embodiments of the claimed invention.

In a preferred embodiment, the wind energy conversion method and system into electrical energy can be represented as follows.

The wind energy conversion system comprises a guide belt 1 with a contact guide, wind energy conversion modules 9 with wind energy receivers 10 (FIG. 1-3), as well as the device (controller) for controlling and coordinating movement of modules 20.

Figure 4:
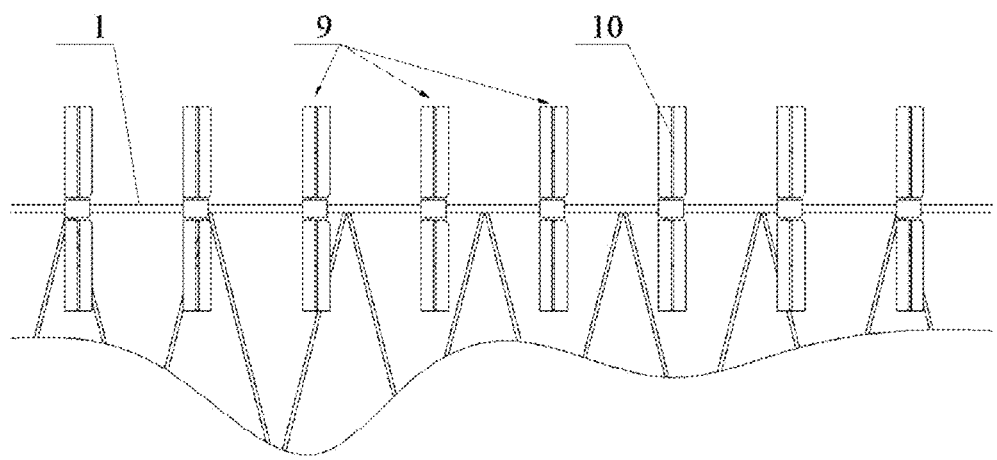
FIG. 4—shows an embodiment of a system of wind energy conversion into electric energy, wherein a guide belt section is mounted on a supporting structure in the shape of an access bridge, wherein the wind energy conversion modules are oriented vertically.

The guide belt 1 consists of straight and curved sections. The sections are mechanically interconnected. The guide belt 1 can be installed on a supporting structure in the shape of an access bridge or is made of a closed curvilinear shape on a broken or mountainous terrain (FIG. 4). The guide belt 1 itself can be made in the shape of a monorail or rail track. The sections of the guide belt 1 can consist of two horizontally arranged guides or two vertically arranged guides or two guides that are tilted towards the horizon. The wind energy conversion modules 9 comprise wind energy receivers 10 and have the possibility of orientation relative to the wind. The modules 9 are moved with the help of wheels 2 along the guide belt 1 due to wind energy. Wherein the type of movement of the modules 9 along the guide belt 1 can be implemented in the shape, for example, of a magnetic bearing (FIG. 8). Wherein the trajectory of the modules 9 is rigidly connected with the contact guide and the guide belt 1 itself.

Figure 5:
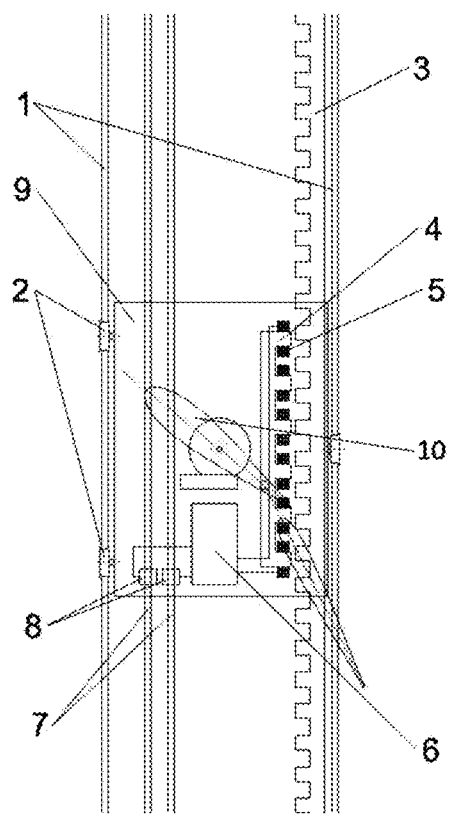
FIG. 5—shows an embodiment of a system of wind energy conversion into electrical energy, wherein the contact guide is made in the shape of an endless gear rail, made of soft magnetic steel, interacting by means of electromagnetic forces with at least one short rail, with windings on the teeth contained in the wind energy conversion modules, representing essentially a single device—linear generator, configured to generate electric current during their interaction.
Figure 6:
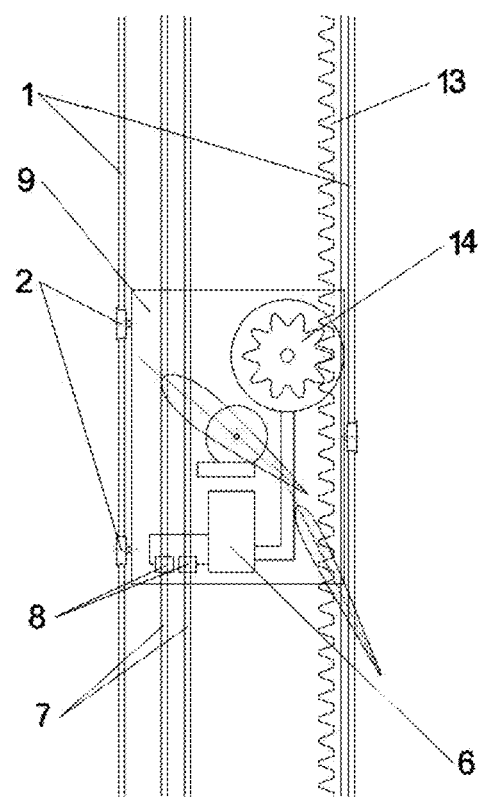
FIG. 6—shows an embodiment of wind energy conversion system into electrical energy, wherein the contact guide is made in the shape of a rack interacting with the movement of the module by means of mechanical forces with at least one gear contained in the wind energy conversion modules and configured to run teeth rail, wherein the wind energy conversion modules comprise a rotary generator mechanically coupled to the gear.

The contact guide can be made in the shape of a continuous gear rail 3 made of soft magnetic steel. Wherein the rail 3 interacts by means of electromagnetic forces with a short rail 4 with windings 5 on the teeth, which is contained in the wind energy conversion modules 9, representing essentially a single device in the shape of a linear generator 6, configured to generate an electric current when they interact and deliver it to the network via cables 7 through the contact device 8 (FIG. 5). Also, the contact guide can be made in the shape of a gear rail 13 interacting at the module 9 movement by means of mechanical forces with at least one gear 14 contained in the wind energy conversion modules 9 and configured to run in the gear rail 14, wherein wind energy conversion modules 9 contain a rotary generator 6 mechanically coupled to the gear 14 (FIG. 6).

The wind energy conversion modules 9 are not mechanically connected to each other. The device for controlling and coordinating movement of modules is configured to change the number of operating modules 9 by introducing further modules 9 onto the guide rail 1 (for example, onto the rail track) or by removing the modules 9 from the guide rail 1, depending on the wind conditions in the current moment of time. The device for controlling and coordinating movement of modules 9 can be also configured to continuously change the speed of each module 9 and the orientation of each wind energy receiver 10 relative to the wind, depending on the wind conditions in the current moment of time. Wherein, the device for controlling and coordinating movement of modules can use parameters, for example, such as current strength, voltage, frequency or phase, of the generated electricity of each module 9 as an information signal. The system may include special modules comprising diagnostic equipment for diagnosing the guide belt, contact guide or snow removal equipment for cleaning the guide belt and contact guide.

There is a method of wind energy conversion into electrical energy, wherein wind energy is converted, be means of aerodynamic operating parts—wind energy receivers 10 mounted on the casing of movable wind energy conversion modules 9, performing linear movement along the guide belt 1 (FIG. 1-4), into the movement energy of the wind energy conversion modules 9 and electric energy by means of an electric power generation device 6 mounted on the housing of the module 9 (FIG. 5, 6). Wherein the parameters are continuously controlled depending on external conditions, such as: setting angles of wind energy receivers 10 relative to wind energy conversion modules 9 and wind directions, speed of wind energy conversion modules 9, geometry of each wind energy receiver 10, including aerodynamic profile and area, the total area of all wind energy receivers 10 put on the guide belt 1.

Wherein the wings with a composite aerodynamic profile including a main profile and at least one tilt flap can be used as a wind energy receivers 10 (FIG. 5, 6).

It is possible to use a rotary type generator as an electric power generation device 6, wherein a gear wheel 14, rigidly connected to the shaft of a rotary type generator, is run around a gear rail 13, which is rigidly connected with the guide belt 1. It is also possible to use a linear generator, wherein the movable part (continuous gear rail 3) of the linear generator mounted on the module 9 casing moves along the stationary part (short rail 4) of the linear generator, which is rigidly connected with the guide belt 1.

Figure 2:
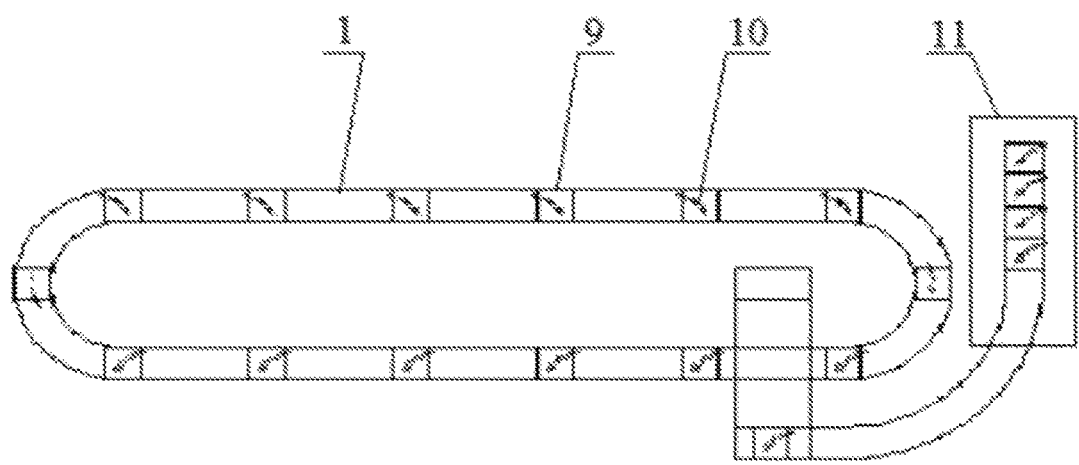
FIG. 2—similar, embodiment of the rail plant with the ability to add modules.
Figure 3:
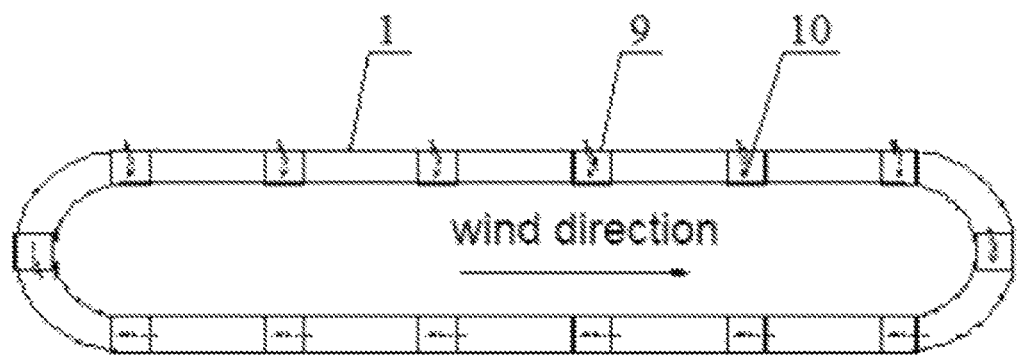
FIG. 3—similar, plant embodiment for crosswind operation.

The embodiment of the method can be implemented so that the guide belt 1 is positioned such that there are at least two closely spaced sections of the guide belt 1 with multidirectional movements of the wind energy conversion modules 9, with each successive row of energy conversion modules 9 in the direction of the wind moving efficiently using downwash flow after the preceding row (FIG. 1-3).

The total surface area of aerodynamic operating parts of receivers 10 can be changed by changing the area of each wing and/or adding further modules 9 to the guide belt 1 or removing modules 9 from the guide belt 1, depending on the wind conditions in the current moment of time.

The aerodynamic force occurs when the wind blows the wind energy receivers 10—aerodynamic operating parts, mounted on the modules 9. This force moves the module 9 along the guide belt 1, wherein the wind energy receiver 10 is constantly oriented in the direction of the wind to create the best thrust in each section of the guide belt 1, depending on the direction of the wind. The electrical energy generating device 6 rigidly installed on the module 9 interacts with the contact guide, which in turn is connected with the guide belt 1. As a result of the work performed by the force arising from the interaction of the generator 6 and the contact guide the generator 6 generates an electric current, which in turn is transmitted to the network laid along the guide belt 1. Wherein, depending on the parameters of the generated electricity, the continuous control of the speed of the module 9 occurs, since the generator 6 is actually a brake for moving the module 9 under the influence of wind force. Also, there is a continuous control of the number of modules 9 put in a particular moment in time. Wherein, for example, for diagnostics or maintenance of the module 9, it is driven into the depot 11 without shut-down of the entire system and all modules removed at a given time. For this, preliminary, the section of the belt 1 is switched from the movement along a closed contour to the section following to the depot 11, taking into account the current position of the required module 9. If the wind energy at the moment or in this area is not enough for such a manoeuvre, then the electrical energy generating device 6 is transferred to the motor mode, consuming electricity from the network. Similarly, modules 9, including special purpose modules 9, for example, diagnostic or snow removal, are guided on the guide belt 1. Thus, in particular, it is possible to change the total surface area of the wind energy receivers 10 during the embodiment of the method. It should be noted that the above operation of the system in the general case does not depend on how exactly the guide belt 1, the generator 6, the type of the module 9 bearing on the guide belt 1 in their particular cases is made.

The claimed invention, except for the absence of the above disadvantages of technical solutions known from the prior art, also has a number of advantages, including over analogues:

the invention allows to increase the average annual collection of wind energy by maintaining optimum parameters in a wide range of winds by changing the installation parameters—the number of wings, the speed of the wings, the angles of the wings, the aerodynamic profile of the wing, the area of each wing separately, the number of operating generators, without changing equipment and software;

the invention allows the system to operate in optimum mode under a small speed of wings, which eliminates the generation of infra sound, causing harm to animals and people, allows to place the plant close to consumers;

the invention allows to build a system based on a modular structure, wherein the modules are serial products of a small size, which reduces their cost, simplifies maintenance and repair; simplifies delivery to the installation site and installation;

wind energy receivers are lightly loaded with centrifugal forces, which allows the use of inexpensive durable structural materials, steel and fibreglass;

the invention allows the flexible use of land resources of the area, through the use of any geometry and length of the path;

the invention allows to easily increase the power of the system by increasing the path length, and increasing the number of operating modules;

the invention allows to build a system that works under any direction of the wind, without the need to orient the entire plant relative to wind;

when using the invention, the failure of some of the modules does not stop the plant, it is possible to perform service and repair work in the modules without shut-down of the entire system;

the invention allows to build a system based on the use of prototypes already mastered in the production of railway transport and roller coaster attractions.

The invention claimed is:

1. A method for converting wind energy into electrical energy, the method comprising:
converting the wind energy into motion energy of wind energy conversion modules via wind energy receivers mounted on a casing of movable wind energy conversion modules, which perform a linear movement along a guide belt, and into electrical energy via an electrical energy generating device,
wherein in accordance with external conditions constant adjustments are made to a total area of all of the wind energy receivers brought onto the guide belt, and
wherein in accordance with external conditions constant adjustments are made to aerodynamic profiles of each wind energy receiver.

2. The method according to claim 1, wherein in accordance with external conditions constant adjustments are made to setting angles of the wind energy receivers relative to the wind energy conversion modules.

3. The method according to claim 1, wherein in accordance with external conditions constant adjustments are made to the wind energy conversion modules speed.

4. The method according to claim 1, wherein in accordance with external conditions constant adjustments are made to the area of each wind energy receiver.

5. The method according to claim 1, wherein a rotary type generator is used as the electrical energy generating device, the rotary type generator has a shaft which is rigidly connected to a gear wheel run on a gear rail connected with the guide belt.

6. The method according to claim 1, wherein a linear generator is used as the electrical generating device, a movable part of the linear generator mounted on the casing moves along a stationary part of the linear generator, which is connected with the guide belt.

7. The method according to claim 1, wherein the guide belt is configured with at least two closely spaced areas with multidirectional movements of the wind energy conversion modules.

8. The method according to claim 1, wherein the total area of all of the wind energy receivers is changed by adding further modules to the guide belt or removing modules from the guide belt, in accordance with the wind conditions in the current moment of time.

9. A method for converting wind energy into electrical energy, wherein the method comprises:
converting the wind energy into motion energy of wind energy conversion modules via wind energy receivers mounted on a casing of movable wind energy conversion modules, which perform a linear movement along a guide belt, and into electrical energy via an electrical energy generating device,
wherein in accordance with external conditions constant adjustments are made to a total area of all of the wind energy receivers brought onto the guide belt, and
wherein wings with a composite aerodynamic profile including a main profile and at least one tilt flap are used as wind energy receivers.

10. A system for converting wind energy into electrical energy, comprising:
a guide belt,
wind energy conversion modules including wind energy receivers configured to move along the guide belt due to wind energy, and
a controller for controlling and coordinating movement of wind energy conversion modules,
wherein this guide belt is connected with a contact guide interacting with the wind energy conversion modules ensuring current generation during the movement of the energy conversion modules,
wherein the controller for controlling and coordinating movement of the wind energy conversion modules is configured to change the number of operating modules by adding further modules to the guide belt or removing modules from the guide belt in accordance with the wind conditions in the current moment of time,
wherein the controller for controlling and coordinating movement of the modules is configured to continuously change the aerodynamic profile and/or wing area of each module, depending on the wind conditions in the current moment of time, and
wherein the controller for controlling and coordinating movement of the modules uses parameters of the generated electricity of each module as an information signal.

11. The system according to claim 10, wherein the controller for controlling and coordinating movement of the modules is configured to continuously change the speed of each module depending on the wind conditions in the current moment of time.

12. The system according to claim 10, wherein the controller for controlling and coordinating movement of the modules is configured to continuously change the orientation of each wind energy receiver relative to the wind, depending on the wind conditions in the current moment of time.

13. The system according to claim 10, wherein the guide belt is mounted on a supporting structure in the shape of an access bridge.

14. The system according to claim 10, wherein the guide belt is made curved for terrain of a predetermined type, in order to move the wind energy conversion modules.

15. The system according to claim 10, wherein the guide belt is closed.

16. The system according to claim 10, wherein the guide belt is made in the shape of a rail track.

17. The system according to claim 16, wherein the guide belt is in the shape of a monorail.

18. The system according to claim 16, wherein the guide belt includes straight and curved sections, wherein at least one straight and/or curved section of the guide belt consists of at least two horizontal guides.

19. The system according to claim 16, wherein the guide belt includes straight and curved sections, wherein at least one straight and/or curved section of the guide belt consists of at least two upright guides.

20. The system according to claim 19, wherein at least one wind energy conversion module comprises equipment for diagnosing a guide belt.

21. The system according to claim 19, wherein at least one wind energy conversion module comprises snow removal equipment for cleaning the guide belt and the contact guide.

22. The system according to claim 16, wherein the guide belt includes straight and curved sections, wherein at least one straight and/or curved section of the guide belt consists of at least two tilted to horizon guides.

23. The system according to claim 10, wherein the ability to move along the guide belt is due to magnetic interaction of the wind energy conversion modules with the guide belt.

24. The system according to claim 10, wherein the system comprises at least two closely spaced sections of the guide belt with multidirectional movements of the wind energy conversion modules, so that each next row of energy conversion module in the direction of wind movement can use the downwash flow downstream the preceding row.

25. The system according to claim 10, wherein the contact guide is made in the shape of an endless gear rail made of soft magnetic steel, with windings on teeth, interacting by means of electromagnetic forces, at least one short rail contained in the wind energy conversion module, forming a single device as a linear generator, configured to generate electric current during their interaction.

26. The system according to claim 10, wherein the contact guide is made in the shape of a gear rail with at least one gear contained in the wind energy conversion modules and configured to run in the gear rail.

27. The system according to claim 10, wherein the parameters of the generated electricity of each module are a current strength, voltage, frequency or phase.

* * * * *